United States Patent [19]
Watanabe et al.

[11] Patent Number: 5,872,894
[45] Date of Patent: Feb. 16, 1999

[54] ROBOT CONTROL APPARATUS AND METHOD ELIMINATING ANY INFLUENCE OF MOTION IN A PRECEDING PATH AND A RECORDING MEDIUM STORING THE SAME

[75] Inventors: Atsushi Watanabe; Tomoyuki Terada; Shinsuke Sakamoto, all of Yamanashi, Japan

[73] Assignee: Fanuc, Ltd., Yamanashi, Japan

[21] Appl. No.: 809,789

[22] PCT Filed: Jul. 26, 1996

[86] PCT No.: PCT/JP96/02114

§ 371 Date: Mar. 28, 1997

§ 102(e) Date: Mar. 28, 1997

[87] PCT Pub. No.: WO97/05533

PCT Pub. Date: Feb. 13, 1997

[30] Foreign Application Priority Data

Jul. 28, 1995 [JP] Japan ......................................... 211346

[51] Int. Cl.$^6$ ........................... G05B 19/04; G05B 19/41; G05B 19/25; B25J 9/22
[52] U.S. Cl. ................................ 395/87; 395/80; 395/88; 318/568.12; 318/568.13; 318/568.15; 318/573
[58] Field of Search .................. 395/80, 87; 318/568.12, 318/568.13, 568.15

[56] References Cited

U.S. PATENT DOCUMENTS

| | | |
|---|---|---|
| 4,675,502 | 6/1987 | Haefner et al. ........................ 318/574 |
| 4,685,067 | 8/1987 | French et al. ............................ 364/513 |
| 5,144,211 | 9/1992 | Daggett et al. ..................... 318/568.11 |
| 5,467,003 | 11/1995 | Kosaka et al. ...................... 318/568.13 |

FOREIGN PATENT DOCUMENTS

| | | |
|---|---|---|
| 58-177289 | 10/1983 | Japan . |
| 61-136105 | 6/1986 | Japan . |
| 64-108604 | 4/1989 | Japan . |
| WO 95 04312 | 2/1995 | WIPO . |

*Primary Examiner*—Reba I. Elmore
*Assistant Examiner*—Navin Natnithithadha
*Attorney, Agent, or Firm*—Staas & Halsey

[57] ABSTRACT

A robot control method capable of eliminating any influence of motion in a preceding path section to assure an accurate path movement with respect to a portion of a path section toward an end point. In a motion statement, a path-assurance section is previously designated in terms of length, time or path-assurance ratio for a moving path [2]→[3]. A path motion plan EFGH for the moving path [2]→[3] is created so that a path section represented by DHGK is the path-assurance section designated in the motion statement, assuming that D represents a terminal point of the motion along the moving path [1]→[2]. Consequently, an influence of motion of the moving path [1]→[2] is not exerted on the motion after a point in time represented by D or K, to assure a movement on the path [2]→[3] in the path-assurance section.

9 Claims, 6 Drawing Sheets

ROBOT CONTROL APPARATUS AND METHOD ELIMINATING ANY INFLUENCE OF MOTION IN A PRECEDING PATH AND A RECORDING MEDIUM STORING THE SAME

TECHNICAL FIELD

The present invention relates to a control method for an industrial robot, and more particularly to a method of controlling a robot so that an approaching path to a designated taught point is coincident with a path designated in an operation program. The method of the present invention is applicable to a robot for use in handling and assembling a workpiece.

BACKGROUND ART

In moving a robot by a playback operation, an acceleration/deceleration control is performed for individual taught points in accordance with a positioning ratio designated in a motion statement in an operation program. Generally, it is advantageous to designate a lower positioning ratio for saving time for acceleration/deceleration to reduce a cycle time. Consequently, it has been a common practice to designate a lower positioning ratio for a taught point which does not require a high degree of positioning accuracy.

Figure 1:
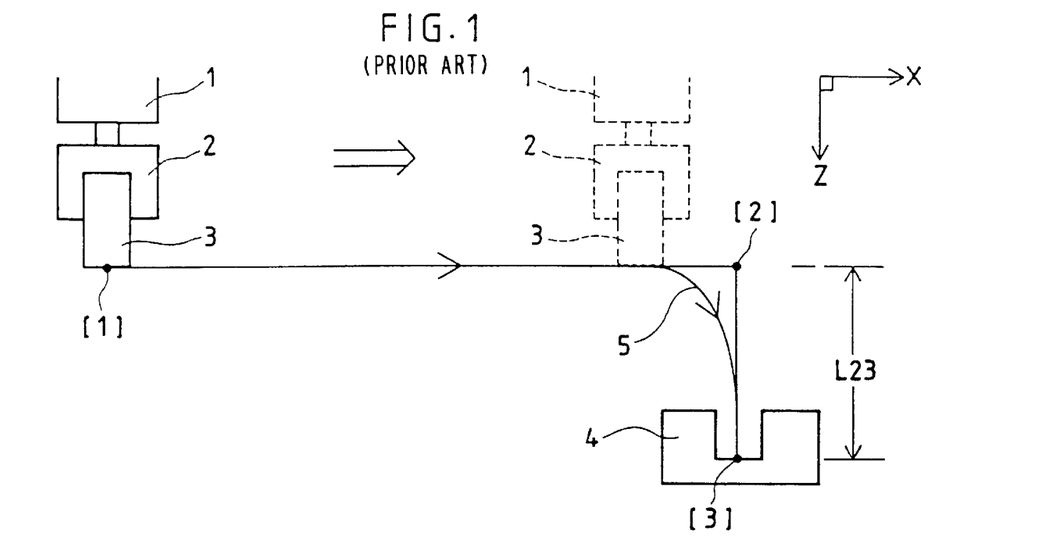
FIG. 1 is a diagram showing one example of moving path in which a workpiece is gripped by a hand attached to an end of a robot arm and assembled to another workpiece by fitting.
Figure 2:
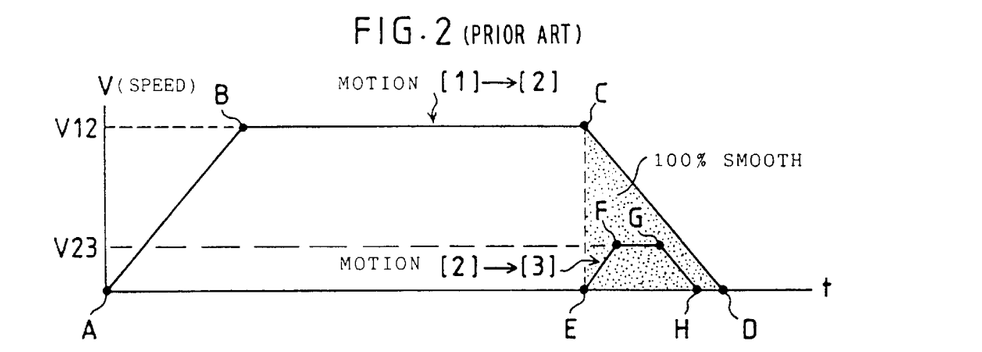
FIG. 2 is a chart showing a path motion plan in which a 100% smooth movement is designated for a position [2] and a 100% positioning movement is designated for a position [3] with respect to the moving path shown in FIG. 1 according to the conventional control method.

However, in a robot for performing an assembling operation by handling a workpiece, for example, if the lower positioning ratio is designated even for the taught point which does not require a high degree of positioning accuracy, there is a problem in operation reliability. FIGS. 1 and 2 show a typical case having such problem.

FIG. 1 shows a moving path in assembling a workpiece 3 by fitting it to another workpiece 4 by gripping the workpiece 3 by a hand 2 attached to a robot arm end 1. FIG. 2 is a chart showing the content of a path motion plan in which a smooth motion of 100% (a positioning ratio of 0%) is designated for the position [2] and a positioning motion of 100% is designated for the position [3], with an axis of abscissa representing time t and an axis of ordinate representing speed V.

In FIG. 1, [1], [2] and [3] represent the taught points for a tool point whose position is predetermined with respect to the hand 2 of the robot, and a straight motion is designated for each of the path sections [1]→[2] and [2]→[3]. Since the position [3] located right under the position [2] is a position at which the fitting operation is completed, a positioning of 100% is necessarily designated in the motion statement. Contrary, since the position [2] is only a transit point where the direction of the movement is changed from horizontal to vertical, it is advantageous to designate "100% smooth", i.e. a positioning ratio of 0% for the position [2] in the motion statement in order to reduce the cycle time.

However, if a lower positioning ratio is designated for the position [2], an accuracy of the locus would be lowered around the position [2] which forms a corner. Namely, as indicated by reference numeral 5, the robot moves toward the position [3] on a path deflected off the taught path near the position [2].

Specifically, when "100% smooth" is designated for the position [2] and "100% positioning" is designated for the position [3], a path motion plan is created so that a motion EFGH (instruction speed V23) for the path [2]→[3] in the Z-axis direction starts simultaneously with a start (a point C of time) of a deceleration control movement contained in a motion ABCD (command speed V12) for the path section [1]→[2] in the X-axis direction, as shown in FIG. 2. This means that a part (from the point C to the point D) of the motion for the preceding path section [1]→[2] has not been completed even at a point (point H) when the motion for the succeeding path section [2]→[3] is completed.

As a result, a path approaching the position [3] is deflected from the straight path [2]→[3] and there is a possibility that the fitting operation is not performed smoothly. In general, this tendency would be more remarkable when the command speed V12 for the path section [1]→[2] is higher and the length L23 of the path section [2]→[3] is shorter.

In order to avoid the foregoing problems, it has been a common practice to make a try-and-error adjustment operation including (1) lowering the command speed V12 for the path section [1]→[2]; (2) designating a high positioning ratio (for example, 100%) for the position [2]; and (3) locating the position [2] remote from the position [3].

SUMMARY OF THE INVENTION

It is an object of the present invention to eliminate any influence of motion for the preceding path section from an intermediate point to an end point on a designated path section, so that an actual moving path of the robot is coincident with an intended path. Another object of the invention is to reduce the operator's labor involved in adjusting the teaching contents on a try-and-error basis and to eliminate any loss of the cycle time.

In the following description, "path-assurance" is referred to as assuring that an approaching path to an end point of a path section is not deflected from the taught path, and "path-assurance section" is referred to as a section where the path-assurance is performed (from the intermediate point to the end point on the path section).

According to the present invention, a path-assurance section is designated in a motion statement for a desired path section and a path motion plan is created based on the motion statement in a robot control system so that a motion for a preceding path section is completed when the robot reaches a start point of the path-assurance section (an intermediate point set between a start point and an end point of the path section).

The path-assurance section in the motion statement can be designated by (1) expressing the position of the intermediate point by a spacial length of the path-assurance section; (2) expressing the position of the intermediate point by a ratio of the path-assurance section with respect to the path section; and (3) expressing the position of the intermediate point by a time period of motion on the path-assurance section.

Interpolation points are created by an interpolation operation based on the path motion plan in accordance with the above conditions and transferred to a servo control system for controlling the individual axes of the robot. When an interpolation point corresponding to the start point of the path-assurance section (the intermediate point in the path section) is transferred to the servo control system and the individual axes operate for the interpolation point, a motion for the preceding path section is completed. Therefore, an accuracy of the path motion of the robot in the path-assurance section is not deteriorated by any influence of the motion for the preceding path section.

DESCRIPTION OF THE PREFERRED EMBODIMENTS

In a robot control method of the present invention, a playback operation is performed after a path-assurance section is designated in a motion statement for a motion including a section where an assured path is desired. In a robot control system, motion statements contained in an operation program are successively read and a path motion plan is created based on the motion statements. Then, interpolation points are created by an interpolating operation and are transferred to a servo control system for each axis.

If no path-assurance section is designated in the read motion statement, the path motion plan, the interpolating operation and the transfer of the interpolation points to the servo control system are carried out in the same manner as conventional, thus executing a path motion designated by the motion statement.

Figure 3:
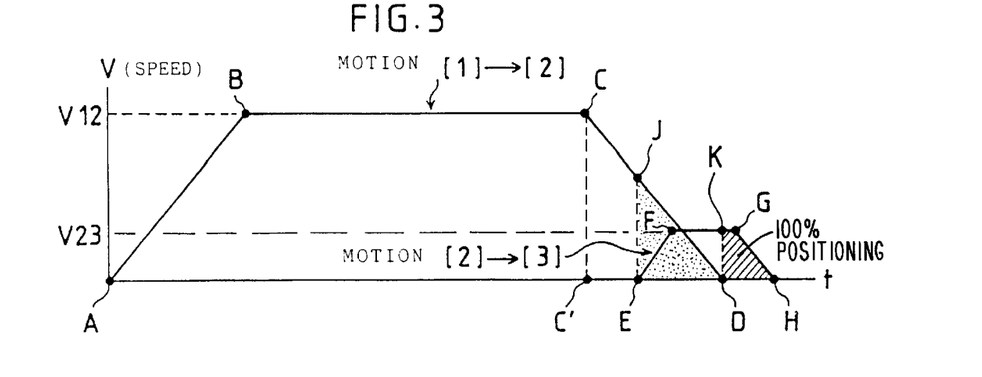
FIG. 3 is a chart showing the path motion plan for the moving path shown in FIG. 1 according to the method of the present invention.

If a path-assurance section is designated in the read motion statement, it requires conditions on a path motion plan, which would not have been required in the conventional art. Such conditions will be described referring to the chart of FIG. 3. FIG. 3 shows one example of the path motion plan to be created when a path-assurance section is designated in a motion statement for motion along a path section [2]→[3] in the moving path shown in FIG. 1.

As is well understood by comparing FIG. 3 with FIG. 2, in a case where "100% smooth" is designated for a position [2] and "100% positioning" is designated for a position [3], if a path-assurance section is designated with respect to the motion for the path section [2]→[3], a path motion plan is created so that an end point D of a motion ABCD in the X-axis direction in a preceding path section [1]→[2] is positioned prior to (preceding in time) an end point H of a motion EFGH in the Z-axis direction in the path section [2]→[3].

As the X axis in the chart of FIG. 3 represent time, the length of DH represents a time period during which a path is assured. As the Y axis represents speed, an area of a region DHGK represents a spatial length (distance) of the path-assurance section. Therefore, in the motion statement, if a path-assurance section is designated in terms of spatial length, a path motion plan is created so that the area of the region DHGK corresponds to the spatial length.

When a path-assurance section is designated by a path-assurance ratio with respect to the path section [2]→[3], a path motion plan is created so that the ratio between the area of the region EFKD and the area of the region EFGH (=length L23 of the path section [2]→[3]; see FIG. 1) corresponds to a designated path-assurance ratio.

Further, in a motion statement, if a path-assurance section is designated in terms of time length, a path motion plan is created so that a length of DH corresponds to the designated time period.

These requirements to a path motion plan can be satisfied by adjusting a position of a start point E of the motion on the path section [2]→[3] on the time axis, provided that a commanded speed and a time constant of an acceleration/deceleration in the section [2]→[3] are not changed.

When the interpolation points created by the interpolation operation based on the path motion plan of FIG. 3 are transferred to the servo control system for each axis, the start time of the motion in the Z-axis direction of the path section [2]→[3] is not a start time point (point C in FIG. 2) of the speed-reduction in the motion of the path section [1]→[2] but is delayed to a time point indicated by J, although "100% smooth" is designated for the position [2].

Accordingly, with respect to the motion after a point K (point D), influence of the motion in the X-axis direction of the path [1]→[2] is eliminated so that a moving path in conformity with the path [2]→[3] is realized. In this case, the ratio of the area of a triangle JED in FIG. 3 with respect to the area of a triangle CC'D represents an effective positioning ratio of the position [2].

Thus, by previously designating a path-assurance section in a motion statement in terms of length, path-assurance ratio or time, the region over which influence of the motion in a preceding path section is exerted is limited so that an intended moving path can be realized with respect to a motion on the designated path-assurance section. It is therefore possible to reduce the labor involved in try-and-error adjusting operation (such as change of command speed, positioning ratio and position of teaching point) for realizing an intended moving path and also to eliminate any loss of the cycle time.

Figure 4:
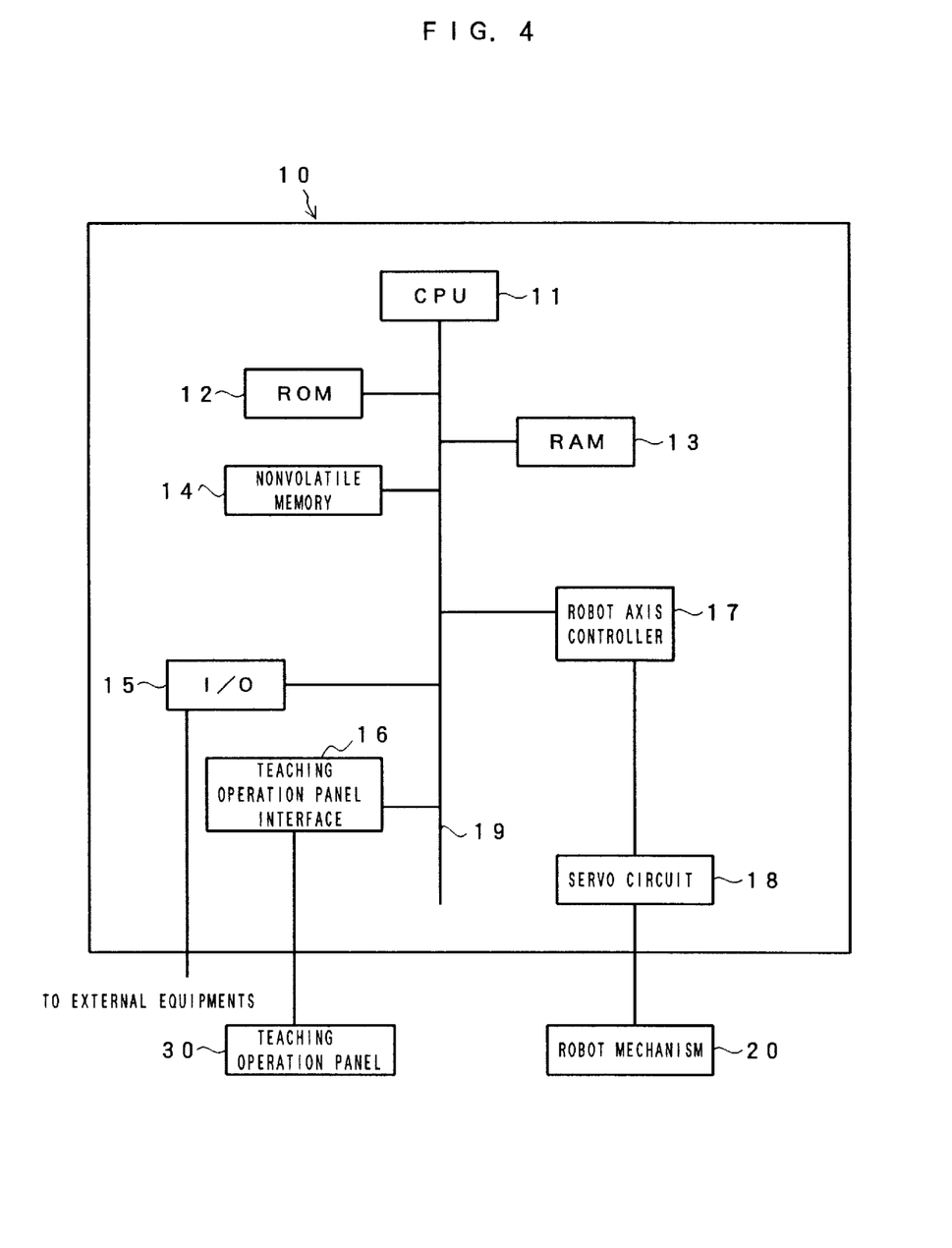
FIG. 4 is a block diagram showing a principal part of a robot control system for use in carrying out the method of the present invention.

FIG. 4 shows a principal part of a robot control apparatus for use in carrying out the method of the present invention as a block diagram. In FIG. 4, a robot control apparatus designated by a reference numeral 10 has a central processor unit (CPU) 11 to which a memory 12 in the form of Read Only Memory (ROM) a memory 13 in the form of Random Access Memory (RAM), a nonvolatile memory 14, an input-output device 15 for external equipments, an interface 16 for an teaching operation panel 30, and a robot-axis controller 17 are connected via a bus 19.

In ROM 12, a program for controlling the whole system including the robot control system 10 is stored. RAM 13 is used for temporary storage of data for various processing executed by CPU 11. In the nonvolatile memory 14, robot operation program data containing motion statements described later, and various set values for operation of the individual parts of the system are stored. Further, the robot-axis controller 17 controls the operation of the individual axes of a robot mechanism 20 via a servo circuit 18.

The arrangement and function of the above robot control apparatus are basically identical with those of the ordinary robot control apparatus. The characteristic feature of the present invention is exhibited in performing the playback operation of the operation program containing the following motion statements are stored in the nonvolatile memory 14.

With respect to the moving path shown in FIG. 1, examples of motion statements written in the operation program in carrying out the method of the present invention and the general processing to be executed by CPU 11 will be described referring to FIGS. 5 through 8.

Figure 5:
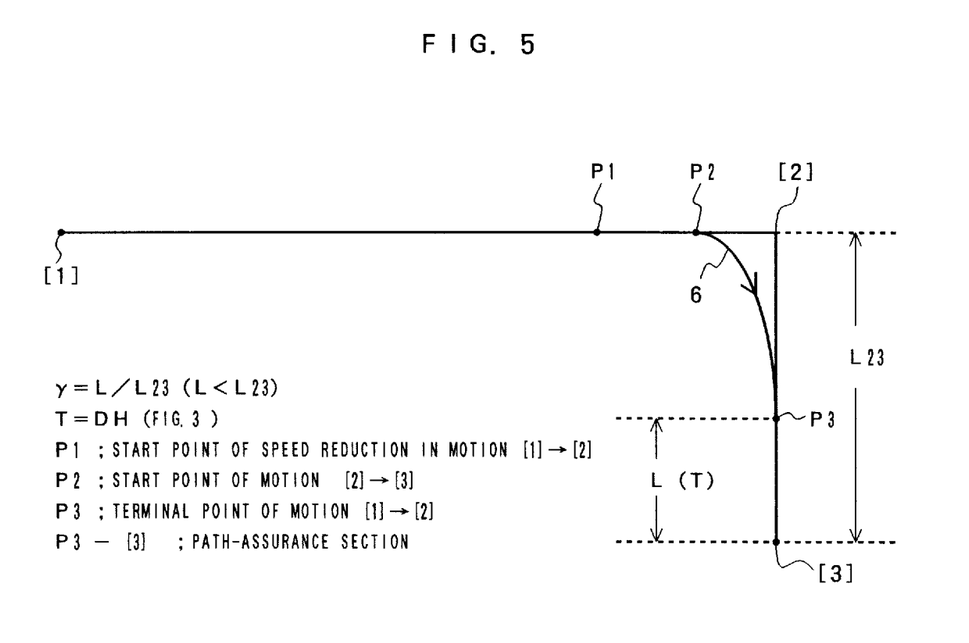
FIG. 5 is a diagram showing one example of a path-assurance section assuring an approaching path to the position [3] in the moving path shown in FIG. 1.

FIG. 5 extracts the moving path [1]→[2]→[3] in the example shown in FIG. 1 and indicates a path-assurance section in which an approaching path to the position [3] is assured, without illustrating the robot arm end and the workpiece. The processing in the playback operation and the robot path to be realized will be described, showing three examples of motion statements created for the path-assurance in approaching the position [3] in the moving path.

The three examples I, II and III of the motion statement designate the path-assurance section in terms of (1) length, (2) time and (3) rate of achievement of path movement, respectively.

[EXAMPLE I]

| | | | |
|---|---|---|---|
| 1: straight | position [1] | 300 mm/sec | positioning |
| 2: straight | position [2] | 100 mm/sec | 100% smooth |
| 3: straight | position [3] | 30 mm/sec | path assurance 100 mm |

Figure 6:
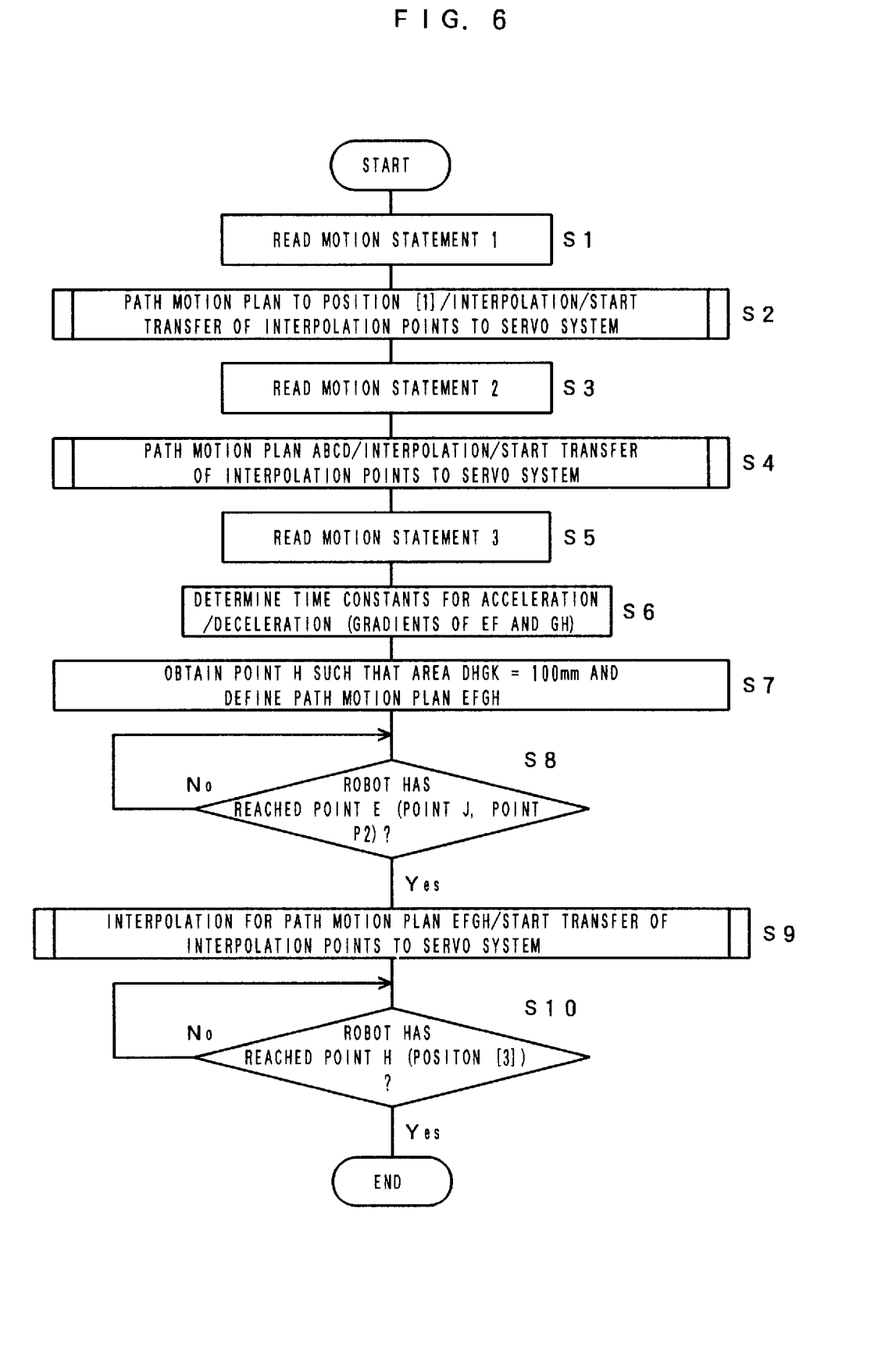
FIG. 6 is a flowchart showing an outline of processing to be executed in a playback operation of an operation program including an example I of motion statements.

The general processing to be performed in the playback operation of the operation program including these motion statements is shown in the flowchart of FIG. 6.

First, the motion statement 1 is read (Step S1). Then, a path motion plan for moving straight and positioning to the position [1] at a commanded speed of 300 mm/sec according to the ordinary method. Interpolation points are created by interpolation operation based on the created path motion plan and are transferred to the servo system at every processing period, thus moving the robot to the position [1] (Step S2).

In the next Step S3, a motion statement 2 is read, and a path motion plan for moving straight to the position [2] at a designated speed of 100 mm/sec according to the ordinary method. Then, an interpolation point is created by interpolation operation based on the created path motion plan and is transferred to the servo system at every processing period, thus starting the movement towards the position [2] (Step S4). The path motion plan created here corresponds to (ABCD), where V12=100 mm/sec, in the chart of FIG. 3.

The robot starts reducing the speed at the point C and the position P1 on the path corresponding to the point C is necessary located before the position [2], and the distance between P1 and [2] corresponds to an area of the region surrounded by the points CC'D in FIG. 3.

When the processing regarding the motion of the path section [2]→[3] is enabled to start, the next motion statement 3 is read (Step S5), and a path-plan creating processing starts to calculate time constants (gradients of EF and GH) for acceleration/deceleration (Step S6). Since the path-assurance section is designated in terms of the distance of 100 mm from the position [3], a point H is calculated such that the area of the region surrounded by DHGK in the chart of FIG. 3 is corresponding to 100 mm, to define a path motion plan for the path section [2]→[3] (Step S7). The position of the point H is calculated using the designated speed V23 (=30 mm/sec) and the values of the time constants determined in Step S6.

Upon arrival at a point J (point E) in the chart of FIG. 3 (or in the preceding processing period), an interpolation operation is performed based on the defined path motion plan (EFGH), to start creating of interpolation points for the individual axes and transferring of the created data (Steps S8–S9).

Immediately after the point J, the moving path of the robot begins to deflect off the straight path section [1]→[2], entering a path indicated by the reference numeral 6. A position P2 in the path section, which corresponds to the point J, is necessarily located between P1 and the position [2], and the distance between P2 and [2] corresponds to the area of the region surrounded by points JED in FIG. 3.

The motion along the path section [1]→[2] is completed when the point D in time comes in the chart of FIG. 3. The position of the robot in the path section at that time is located before the position [3] by a distance 100 mm (at the position P3 determined by L=100 mm in FIG. 5), because the path motion plan is thus defined in Step S7.

The robot enters the straight path section [2]→[3] at the point P3 to move in a straight line along the path-assurance section P3 –[3]. When the motion of the path section [2]→[3] is completed as the robot reaches the end point [3] (Step S10), the processing is terminated. Thus, the robot movement is achieved to realize the path assurance designated in the motion statement 3 in Example I.

[EXAMPLE II ]

| | | | |
|---|---|---|---|
| 1: straight | position [1] | 300 mm/sec | positioning |
| 2: straight | position [2] | 200 mm/sec | 100% smooth |
| 3: straight | position [3] | 60 mm/sec | 100 msec path assurance |

Figure 7:
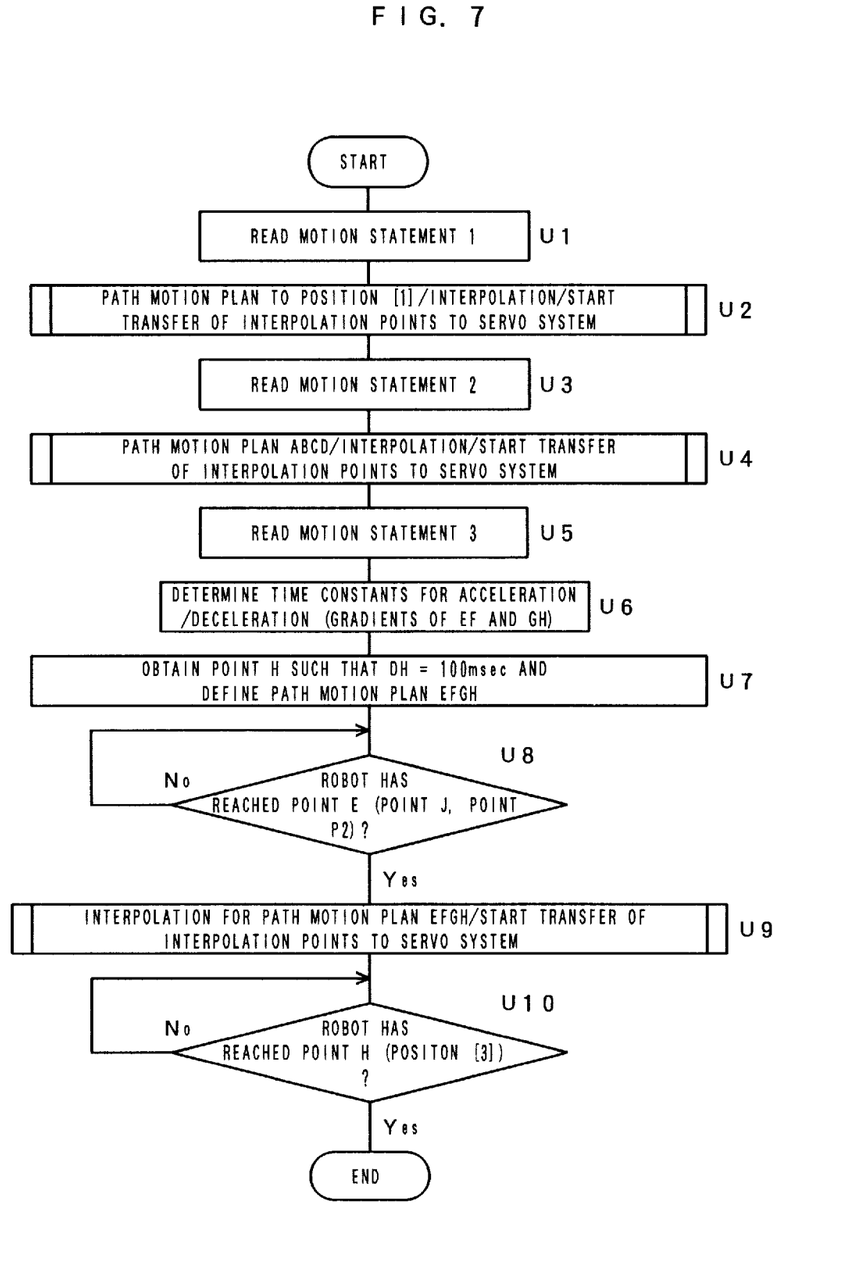
FIG. 7 is a flowchart showing an outline of processing to be executed in the playback operation of an operation program including an example II of motion statements.

The general processing performed in the playback operation of the operation program including these motion command statements is shown in the flowchart of FIG. 7.

First, the motion statement 1 is read (Step U1). Then, a path motion plan for moving straight and positioning to the position [1] at a designated speed of 300 mm/sec according to the ordinary method, whereupon interpolation points are created by the interpolation operation based on the created path motion plan and are transferred to the servo system at every processing period, thus moving the robot to the position [1] (Step U2).

In the next Step U3, a motion statement 2 is read and a path motion plan for moving straight to the position [2] at a designated speed of 200 mm/sec according to the ordinary method. Then, an interpolation point is created by the interpolation operation based on the created path motion plan and is transferred to the servo system at every processing period, thus starting the movement towards the position [2] (Step U4). The path motion plan created here corresponds to (ABCD), where V12=200 mm/sec, in the chart of FIG. 3.

The robot starts reducing the speed at the point C and the position P1 on the path corresponding to the point C, likewise Example I, is necessary located before the position [2], and the distance between P1 and [2] corresponds to an area of the region surrounded by the points CC'D in FIG. 3.

When the processing for the motion of the path section [2]→[3] is enabled to start, the next motion statement 3 is read (Step U5), and a path-plan creating processing starts to calculate time constants (gradients of EF and GH) for acceleration/deceleration (Step U6). Since the path-assurance section is designated in terms of the time 100 msec, a point H is calculated such that the time represented by DH in the chart of FIG. 3 is corresponding to 100 msec, to define a path motion plan for the path section [2]→[3] (Step U7). The position of the point H is calculated using the designated speed V23 (=60 mm/sec) and the values of the time constants determined in Step U6.

Upon arrival at a point J (point E) in the chart of FIG. 3 (or in the preceding processing period), the interpolation operation is performed based on the defined path motion plan (EFGH), to start creation of interpolation points for the individual axes and transferring of the created data to the servo system (Steps U8–U9).

Immediately after the point J, the moving path of the robot begins to deflect off the straight path section [1]→[2], entering a path indicated by the reference numeral 6. A position P2 in the path section, which corresponds to the point J, likewise Example I, is necessarily located between P1 and the position [2], and the distance between P2 and [2] corresponds to the area of the region surrounded by points JED in FIG. 3.

The motion along the path section [1]→[2] is completed when the point D in time comes in the chart of FIG. 3. The position of the robot on the path section at that time is located at the position P3 before the position [3] in the path section [2]→[3].

The robot enters the straight path section [2]→[3] at the point P3 to move in a straight line along the path-assurance section P3 –[2]. When the motion of the path section [2]→[3] is completed as the robot reaches the end point [3] (Step U10), the processing is terminated. Thus, the robot movement is achieved to realize the path assurance designated in the motion command statement 3 in Example B. The time required for the movement along the path-assurance section P3 –[3] is necessarily 100 msec designated by the movement statement 3.

[EXAMPLE III]

| | | | |
|---|---|---|---|
| 1: straight | position [1] | 300 mm/sec | positioning |
| 2: straight | position [2] | 200 mm/sec | 100% smooth |
| 3: straight | position [3] | 60 mm/sec | path assurance 30% |

Figure 8:
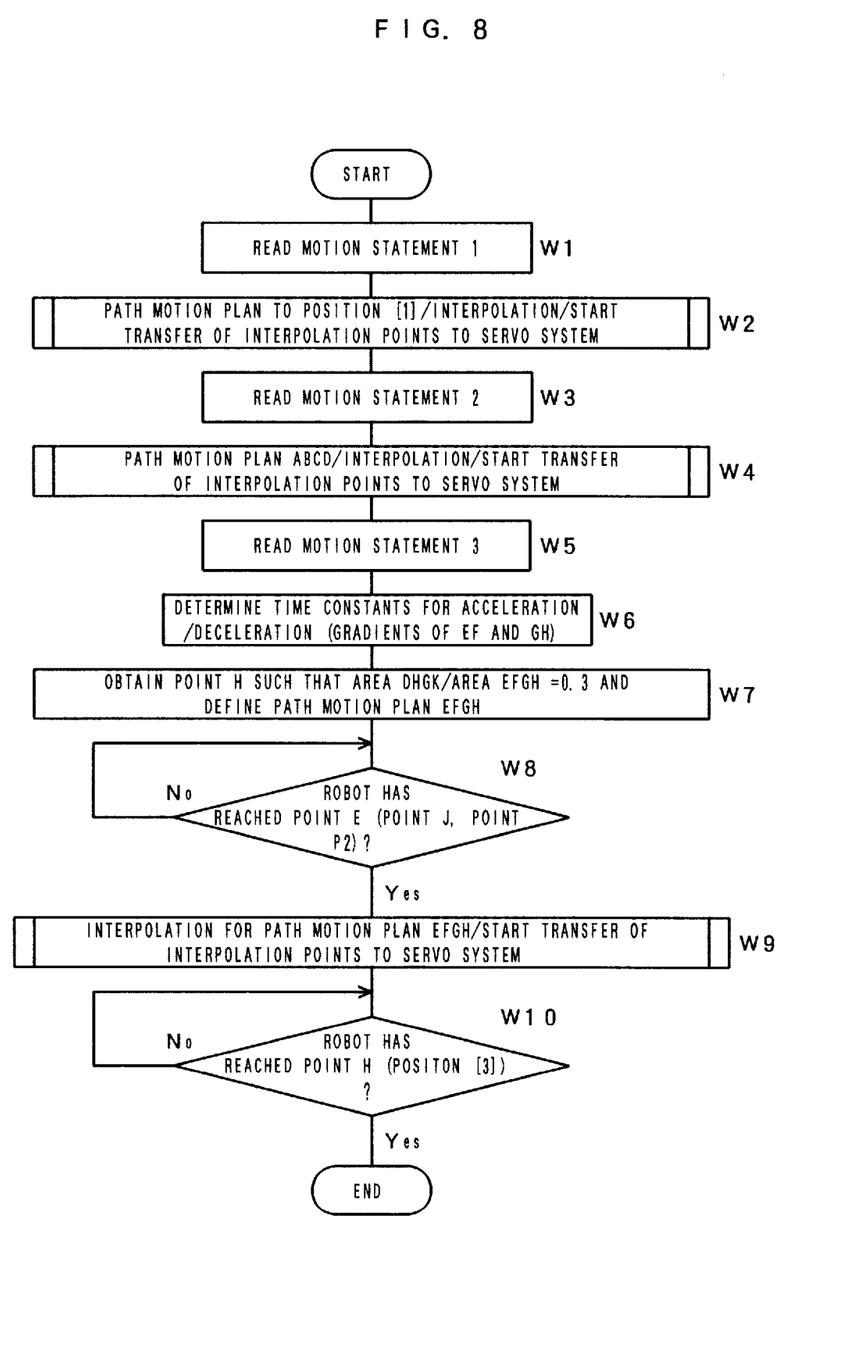
FIG. 8 is a flowchart showing an outline of processing to be executed in the playback operation of an operation program including an example III of motion statements.

The general processing performed in the playback operation of the operation program including these motion command statements is shown in the flowchart of FIG. 8.

First, the motion statement 1 is read (Step W1). Then, a path motion plan for moving straight and positioning to the position [1] at a designated speed of 300 mm/sec according to the ordinary method, whereupon interpolation points are created by the interpolation operation based on the created path motion plan and are transferred to the servo system at every processing period, thus moving the robot to the position [1] (Step W2).

In the next Step W3, a motion command statement 2 is read and a path motion plan for moving straight to the position [2] at a designated speed of 200 mm/sec according to the ordinary method. Then, an interpolation point is created by the interpolation operation based on the created path motion plan and is transferred to the servo system at every processing period, thus starting the movement towards the position [2] (Step W4). The path motion plan created here corresponds to (ABCD), where V12=200 mm/sec, in the chart of FIG. 3.

The robot starts reducing its speed at the point C and the position P1 on the path corresponding to the point C, likewise Examples I and II, is necessary located before the position [2], and the distance between P1 and [2] corresponds to an area of the region surrounded by the points CC'D in FIG. 3.

When the processing for the motion of the path section [2]→[3] is enabled to start, the next motion statement 3 is read (Step W5), and a path-plan creating processing starts to calculate time constants (gradients of EF and GH) for acceleration/deceleration (Step W6). Since the path-assurance section is designated in terms of the path-assurance ratio γ=30% in the motion command statement, a point H is calculated such that the ratio of the area of the region surrounded by DHGK in the chart of FIG. 3 with respect to the area of the region surrounded by EFGH is 30%, to define a path motion plan for the path section [2]→[3] (Step W7). The position of the point H is calculated using the designated speed V23 (=60 mm/sec) and the values of the time constants determined in Step W6.

Upon arrival at the point J (point E) in the chart of FIG. 3 (or in the immediately preceding processing period), the interpolation operation is performed based on the defined path motion plan (EFGH), to start creation of interpolation points for the individual axes and transferring of the created data to the servo system (Steps W8–W9).

Immediately after the point J, the moving path of the robot begins to deflect off the straight path section [1]→[2], entering a path indicated by the reference numeral 6. A position P2 in the path section, which corresponds to the point J, likewise Examples I and II, is necessarily located between P1 and the position [2], and the distance between P2 and [2] corresponds to the area of the region surrounded by points JED in FIG. 3.

The motion along the path section [1]→[2] is completed when the point D in time comes in the chart of FIG. 3. Assuming that P3 represents the robot's position on the path at that time likewise Examples I and II, the position P3 is located before the position [3] by 30% of the straight path section [2]→[3], because the path motion plan is thus determined in Step W7.

The robot enters the straight path section [2]→[3] at the point P3 to move in a straight line along the path-assurance section P3 –[2]. When the motion of the path section [2]→[3] is completed as the robot reaches the end point [3] (Step W10), the processing is terminated. Thus, the robot movement is achieved to realize the path assurance designated in the motion command statement 3 in Example III.

According to the present invention, it is possible to limit the region over which influence of the motion in a preceding path section is exerted, and hence to realize an intended moving path with respect to a motion on a designated path-assurance section. Further, it is possible to reduce the labor involved in try-and-error adjustment operation (e.g., change of command speed, positioning ratio and position of teaching point) for realizing an intended moving path, and also to eliminate any loss of the cycle time.

We claim:

1. A robot control method operating a robot to perform a path motion by controlling respective axes of the robot using a robot control apparatus having a software processing function, said method comprising the steps of:

(a) storing an operation program including a first motion statement for a first path section, and a second motion statement for a second path section following said first path section, said second motion statement including designation of a path-assurance section from an intermediate point to an end point of said second path section;

(b) reading said operation program stored in said step (a);

(c) creating path motion plans realizing a first path motion for said first path section and a second path motion for said second path section based on said first and second motion statements in said operation program read in said step (b), so that said first path motion terminates when the robot reaches said intermediate point in said second path motion;

(d) determining interpolation points based on said path motion plan created in said step (c); and (e) transferring data representing said interpolation points determined in said step (d) to a servo control system for controlling the individual axes of the robot.

2. A robot control method according to claim 1, wherein the position of said intermediate point is designated in terms of a spacial length of said path-assurance section in said step (a).

3. A robot control method according to claim 1, wherein the position of said intermediate point is designated in terms of a time period required to move the robot along said path-assurance section in said step (a).

4. A robot control method according to claim 1, wherein the position of said intermediate point is designated in terms of a path-assurance ratio represented by a spacial length of said path-assurance section with respect to a spacial length of said second path section in said step (a).

5. A robot control apparatus, including software processing functions, operating a robot to perform a path motion by controlling respective axes of the robot, comprising:

a servo control system;

a memory storing an operation program including a first motion statement for a first path section, and a second motion statement for a second path section following the first path section, the section motion statement including designation of a path-assurance section from an intermediate point to an end point of the second path section;

a processing unit reading the operation program stored in the memory, creating path motion plans realizing a first path motion for the first path section and a second path motion for the second path section based on the first and second motion statements in the operation program read by the processing unit, such that the first path motion terminates when the robot reaches the intermediate point in the second path motion, and determining interpolation points based on the path motion plan created by the processing unit; and a controller transferring data representing the interpolation points determined by the processing unit to the servo control system controlling the individual axes of the robot.

6. The robot control apparatus of claim 5, wherein the position of said intermediate point is designated in terms of a spatial length of said path-assurance section in said step (a).

7. The robot control apparatus of claim 5, wherein the position of said intermediate point is designated in terms of a time period required to move the robot along said path-assurance section in said step (a).

8. The robot control apparatus of claim 6, wherein the position of said intermediate point is designated in terms of a path-assurance ratio represented by spatial length of said path assurance section with respect to a spatial length of said second path section in said step (a).

9. A computer-readable medium having stored thereon a plurality of sequences of instructions, the plurality of sequences of instructions including sequences of instructions which, when executed by a processor, cause the processor to perform the steps of:

(a) storing an operation program including a first motion statement for a first path section, and a second motion statement for a second path section following said first path section, said second motion statement including designation of a path-assurance section from an intermediate point to an end point of said second path section;

(b) reading said operation program stored in said step (a);

(c) creating path motion plans realizing a first path motion for said first path section and a second path motion for said second path section based on said first and second motion statements in said operation program read in said step (b), so that said first path motion terminates when the robot reaches said intermediate point in said second path motion;

(d) determining interpolation points based on said path motion plan created in said step (c); and (e) transferring data representing said interpolation points determined in said step (d) to servo control system for controlling the individual axes of the robot.

* * * * *